Figure 3:
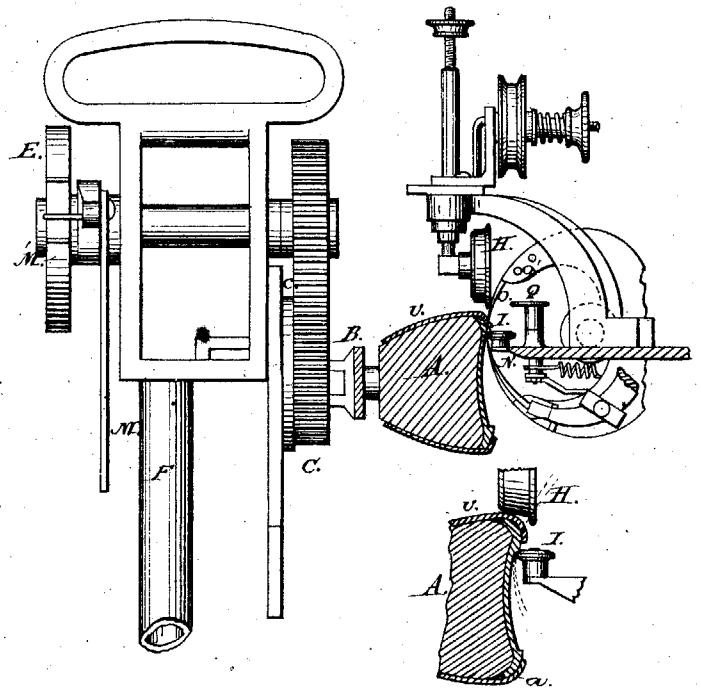

3 Sheets--Sheet 1.
H. DUNHAM, Jr.
Machine for Sewing Boots and Shoes.
No. 6,295. Reissued Feb. 16, 1875.
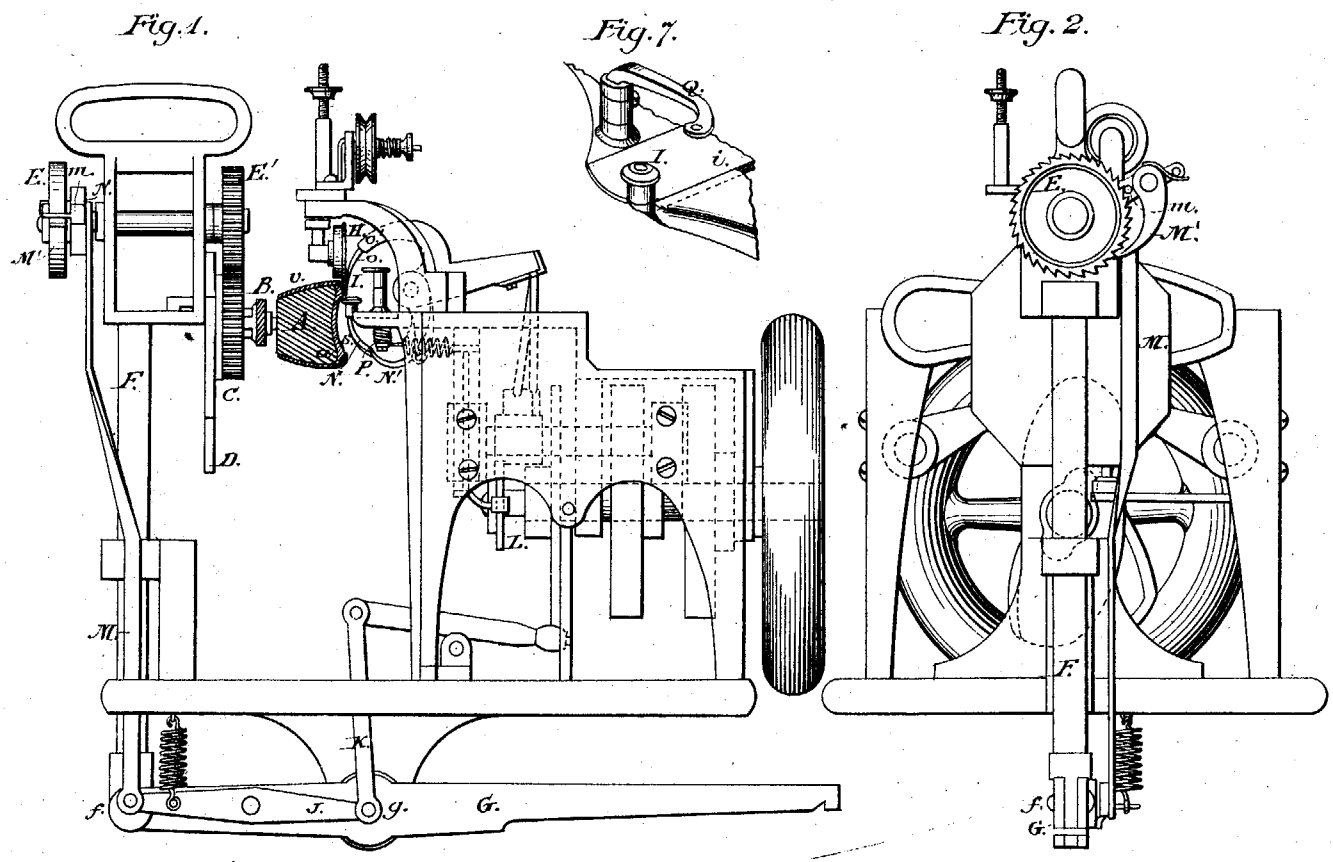
Witnesses:
E. N. Callan
Wm. Hamilton
Inventor:
Gordon McKay
Trustee of the McKay Sewing Machine Association Assee of Henry Dunham Jr.
per Coosly & Gregory Attys
THE GRAPHIC CO. PHOTO.-LITH. 39 & 41 PARK PLACE, N.Y.

3 Sheets--Sheet 2.

H. DUNHAM, Jr.

Machine for Sewing Boots and Shoes.

No. 6,295. Reissued Feb. 16, 1875.

Witnesses:
E. N. Callan
Amy H. Atherton

Inventor:
Gordon McKay Trustee of the McKay Sewing Machine Association, Assee of Henry Dunham Jr
per Crosby & Gregory Attys.

THE GRAPHIC CO. PHOTO-LITH. 39 & 41 PARK PLACE, N.Y.

3 Sheets--Sheet 3.

H. DUNHAM, Jr.

Machine for Sewing Boots and Shoes.

No. 6,295. Reissued Feb. 16, 1875.

*Witnesses:*
E. N. Callan
Wm. H. Appleton.

*Inventor:*
Gordon McKay, Trustee of McKay Sewing Machine Association Assee of Henry Dunham Jr.
per Emery & Gregory Attys

THE GRAPHIC CO. PHOTO-LITH. 39 & 41 PARK PLACE, N.Y.

UNITED STATES PATENT OFFICE.

HENRY DUNHAM, JR., OF ABINGTON, ASSIGNOR, BY MESNE ASSIGNMENTS, TO GORDON McKAY, TRUSTEE OF THE McKAY SEWING-MACHINE ASSOCIATION, OF BOSTON, MASSACHUSETTS.

IMPROVEMENT IN MACHINES FOR SEWING BOOTS AND SHOES.

Specification forming part of Letters Patent No. 36,396, dated September 9, 1862; reissue No. 1,363, dated December 16, 1862; reissue No. 3,386, dated April 20, 1869; reissue No. 6,081, dated October 13, 1874; reissue No. 6,295, dated February 16, 1875; application filed February 8, 1875.

*To all whom it may concern:*

Be it known that HENRY DUNHAM, Jr., of Abington, Massachusetts, invented certain Improvements in Machinery for Sewing Boots and Shoes; and I, GORDON McKAY, trustee, assignee of the entire interest in the said DUNHAM'S invention, hereby declare that the following is a sufficiently full and exact description of the same to enable one skilled in the art to which it appertains to carry it into effect, reference being had to the accompanying drawings, which are made a part of this specification.

In uniting soles by hand to uppers in the manufacture of what are known as turned shoes, (the soles and uppers being wrong-side out when united,) the workman makes with his awl a curved path for the thread, the awl dipping into the sole and then coming out at the same surface and through the upper. For a machine process, where the skill of the workman is wanting, and where the needle must necessarily move in the same fixed path irrespective of the nature of the stock or the relative positions of the parts to be united, it is essential that the respective parts to be united shall be so griped, guided, and presented as to insure the passage of the needle at each advance into and out of the sole, (without penetrating to the ultimately outer face of the sole,) and through the upper; and that the feed movement shall be such, in connection with the griping and guiding, as to insure the passage of the needle with uniform precision through the corresponding parts along the whole length of the sole and upper brought together to be united. For such work the sole is channeled with a gash, entering at some distance from the sole-edge and extending toward the edge, and the needle-point enters the channel, passing in and coming out at or toward the edge.

This invention relates particularly to the devices and combinations by which the parts to be united are placed in the proper relation to each other, and are griped, guided, and presented to a sewing mechanism which operates to unite the sole and upper by stitches which pass into, but do not pass through, the entire thickness of the sole, and to certain devices in that sewing mechanism itself.

Figure 4:
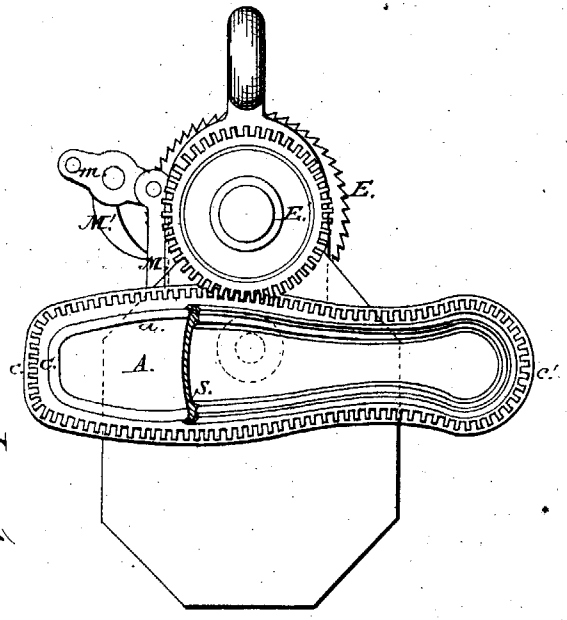
Figure 5:
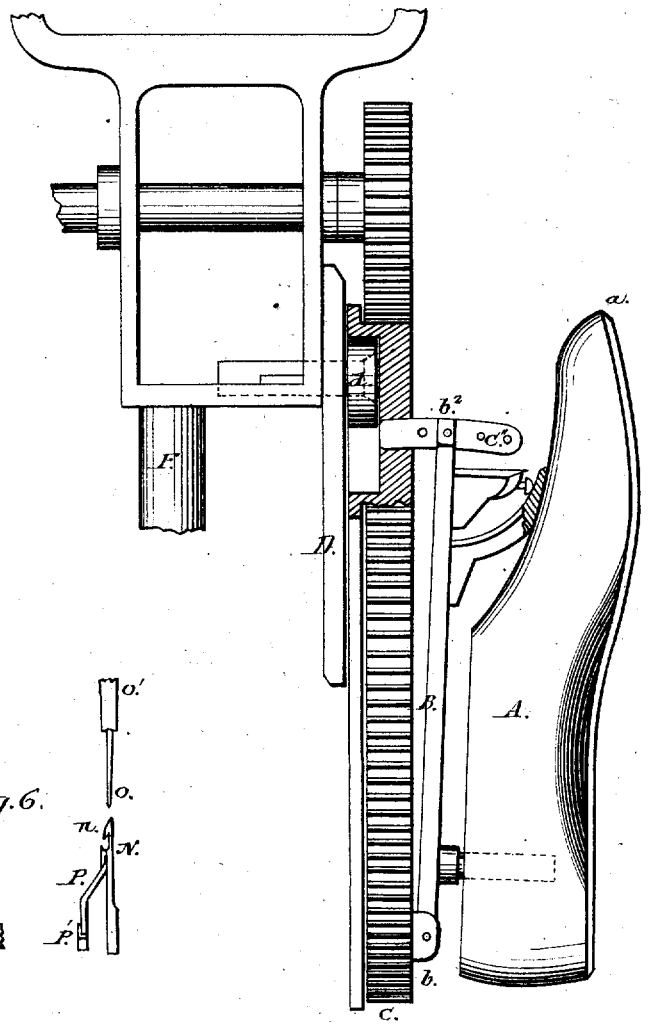
Figure 6:
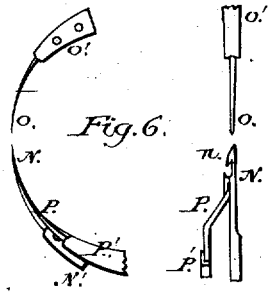

In the drawings, Figure 1 is a side elevation of the machine with the last and last-holder in section. Fig. 2 is a rear view. Fig. 3 is a side elevation on a larger scale of the principal operating parts, representing the last and last-holder in section. Fig. 4 is a front view of the last, last-carrier, supporting-plate, and feed mechanism, hereinafter described. Fig. 5 is a side elevation, partly in section, of the last, last-holder, and the carrying and supporting plates of the jack and their connections, representing the moving parts in the position assumed while sewing around the toe. Fig. 6 is a diagram showing in side and front elevation the curved awl, needle, and cast-off in their relative positions. Fig. 7 shows the guide I and its plate *i*, the latter being adjustable in suitable ways on the frame.

In sewing shoes on this machine, the work is applied to a last, A, which is preferably formed with a concave bottom, and is so chamfered or beveled near its periphery as to form around the margin of the bottom a ridge, *a*, about which the margin of the sole is pressed and held in the act of sewing in proper position to receive the margin of the upper, which is to be sewed thereto. The last is connected with the rod of the jack F by means of a last-holder, B, and a carrying-plate, C, that, in turn, rests against a supporting-plate, D. The carrying-plate C bears against the supporting-plate, a wheel or roller on the latter entering a groove in the carrier, and the latter is retained on the roller by the action of the toothed wheel E′ against the flange *c* of the carrier. This wheel E also engages the teeth *c′* of and turns the carrier, and imparts the feed-movement to the shoe or jack. The last-holder is hinged to the carrying-plate at *b*, and is adjustable with relation to the carrying plate and jack, so as to permit the position of the sole to be adjusted, or to set the toe properly with relation to the heel for sewing. The periphery of the carrying-plate is of a form approximating to that of the last. The parts above described are mounted on the lever G, having its fulcrum at *g*, and the connection between the rod of the jack and lever permits the jack to turn on the lever, in order that the distance of the last-holder from the sewing-mechanism may be varied, as may be required, and by the vertical play of the jack-supporting lever G, the work may be held constantly up to the sewing-mechanism. A guide or a guiding and resisting surface is employed, against which the upper at the edge of the last rests or is borne, and this guide, against which the shoe is so held for sewing, is preferably constructed in the form of a flanged wheel, H, the pressing-surface of which is adapted to hold the edge of the upper *v* firmly and snugly around the edge of the sole *s*, as represented in Fig. 3. The guiding of the work is effected in conjunction with the mechanism already described by a wheel or plate, I, working in the customary channel of the sole, bearing against the two inner faces or the inner angle of the channel, and serving also to open the said channel, preparatory to sewing. The two guides H I serve not only to determine the correct position of the work, but to govern the points of entrance and exit of the needle. The guide I runs in the channel, and the sole and guide are pressed firmly together as the stitch is being formed in the sole. This guide is mounted on an adjustable plate, and is movable across the path of the needle's movement, and, by adjusting this guide with reference to the path in which the needle moves, the depth of the stitch in the sole and its exit from the sole, at or near its edge, are regulated.

The intermittent feed-movement is communicated through a short lever, J, having its fulcrum upon the lever G, and so proportioned and applied that it will operate with great effect in all positions of the lever G. To one end of the lever J is attached a rod, K, actuated by the cam-shaft L, and to the other a rod, M, which is pivoted to a lever, *m*, carrying a pawl, M′, which actuates the ratchet-wheel E. The sewing is effected by a curved hooked needle, N, mounted on a curved lever, N′. This needle is so constructed and applied that its outer surface will be concentric, or nearly so, with the center of motion, and is of elliptical form in its transverse section, to adapt it to produce or pass through a hole which is elongated in a direction parallel with the edge of the sole.

The preliminary punching of the work may be effected by an awl, O, having a curvature concentric with and similar to that of the needle N, and so flattened as to produce an elongated hole, in the manner already explained. O′ represents the curved lever to which the awl is attached. The hook *n* is formed upon the side or flank of the needle N, rather than upon its curved front or back. Hence its projection is lengthwise of the elliptical hole produced by the awl or needle, and any lateral or radial straining of the leather is avoided. The hooked needle N, when projected through the work, takes the thread from a vibrating thread-carrier, Q, of common form, draws the loop through the work and through the loop previously formed, which rests upon a needle-closer or cast-off, P, so as to prevent the needle-hook catching the old loop a second time. The needle-closer is carried by a lever, P′, which vibrates on the same center as the levers N′ and O′. The hooked needle N and its cast-off P operate as do other needles and cast-offs in wax-thread sewing-machines making a chain-stitch. The stitch has two faces, one face showing a single line of thread, and the other a looped line, and one of these faces rests in the channel formed in the sole.

The jack, it will be seen, may be readily and easily moved by the workman to mount a shoe on or remove a shoe from the last, or to present the shoe to or to remove it from the action of the sewing parts.

I claim—

1. In a machine for sewing soles to uppers by a line of stitches, one face of which lies in a channel cut in the sole, and which stitches pass into, but not entirely through the thickness of the sole, the combination of the following instrumentalities, viz., a guide or channel-opener adapted to enter and bear against the two inner faces or the inner angle of the channel, a guide or guiding or resisting surface, against which the upper at the edge of the last rests, or is borne, and a movable jack or last-carrier for supporting the shoe, all operating to hold and present the shoe to the action of the sewing mechanism, substantially as shown and described.

2. In a machine for sewing boots and shoes known as turns, and operating to connect a sole and upper, mounted on a last, a guide, or channel-opener, (that enters the channel in and bears against the inner face of the sole or channel,) combined with a guide or surface against which the upper at the edge of the sole rests, and with a needle and thread-guide operating to connect such sole and upper by stitches which pass into the sole.

3. In a machine for sewing turned shoes, the combination with the guide made to enter in and bear against the inner face of the sole or channel, of the guide or surface constructed to hold and bear the outer edge of the sole toward the face of the last, whereby the needle may enter and pass from the same side of the sole.

4. The last, having the ledge or edge *a*, adapted to bear on the sole between the channel and edge of the sole, in combination with guides or gages H and I, the combination operating to bend the sole about such ledge or ridge for the passage of the needle.

5. In combination with a last-carrier, supported substantially as described, whereby its distance from the sewing mechanism may be varied, a feed-movement, acting through the said last-carrier, as set forth.

6. The combination of the guides or gages

H and I bearing against the same side or face of the work, for the purpose of regulating the entrance and exit of the needle or other piercing instrument and the distance of the stitches from the edge of the sole.

7. The guide or bearing H, constructed with two bearing faces or surfaces adapted to bear on or hold the upper around the edge of the sole, substantially as described.

8. The guide I, combined with the needle, and rendered adjustable with reference to the path in which the needle moves, as and for the purpose set forth.

9. The curved needle N, when constructed with a hook upon its side or flank, substantially as described.

10. The combination of the curved needle N and the cast-off P, constructed and operating substantially as and for the purposes stated.

11. The combination of the curved awl O and curved hooked needle N, substantially as described.

GORDON McKAY,

*Trustee of the McKay Sewing-Machine Association.*

Witnesses:
G. W. GREGORY,
S. B. KIDDER.